United States Patent
Cech

[11] Patent Number: 5,417,536
[45] Date of Patent: May 23, 1995

[54] LIFT TRUCK WEIGHING APPARATUS

[75] Inventor: Werner J. Cech, Livonia, Mich.

[73] Assignee: Cech Corporation, Saginaw, Mich.

[21] Appl. No.: 159,668

[22] Filed: Nov. 30, 1993

[51] Int. Cl.$^6$ .................... B60P 5/00; G01G 19/08
[52] U.S. Cl. ........................ 414/21; 177/140
[58] Field of Search ............. 414/21; 177/130, 139, 177/140, 146

[56] References Cited

U.S. PATENT DOCUMENTS

| | | | |
|---|---|---|---|
| 2,358,770 | 9/1944 | Carliss | 177/130 |
| 3,063,576 | 11/1962 | Hofmeister | 414/21 |
| 4,638,876 | 1/1987 | Balduin et al. | 177/139 |
| 4,666,004 | 5/1987 | Raz | 177/140 X |
| 4,899,840 | 2/1990 | Boubille | 177/140 X |

FOREIGN PATENT DOCUMENTS

| | | | |
|---|---|---|---|
| 0480601 | 4/1992 | European Pat. Off. | 177/130 |
| 1913527 | 10/1969 | Germany | 414/21 |
| 8901884 | 2/1991 | Netherlands | 414/21 |
| 9108977 | 6/1991 | WIPO | 414/21 |

OTHER PUBLICATIONS

Allegany Technology, Inc., publication relating to Palletweigher Models PW-4.5K and PW-6.7K.
Allegany Technology, Inc., publication relating to Palletweigher Series 701 3K.
Aatlas publication relating to Kwik-Weigh portable scale and identifying U.S. Pat. No. 4,666,004.

Primary Examiner—Michael S. Huppert
Assistant Examiner—James W. Keenan
Attorney, Agent, or Firm—Learman & McCulloch

[57] ABSTRACT

A pallet truck has a rigid frame mounting a plurality of load cells. Ball and socket coupling devices are connected to the load cells and support a platform assembly. The frame and platform assembly are able to be elevated to lift and support an object to be weighed on the platform assembly. The ball and socket coupling devices enable the platform assembly to shift laterally to dissipate lateral forces and then restore the platform assembly to a position wherein the weight of the object is transmitted along associated load axes of the load cells for accurately measuring the weight of the object.

16 Claims, 5 Drawing Sheets

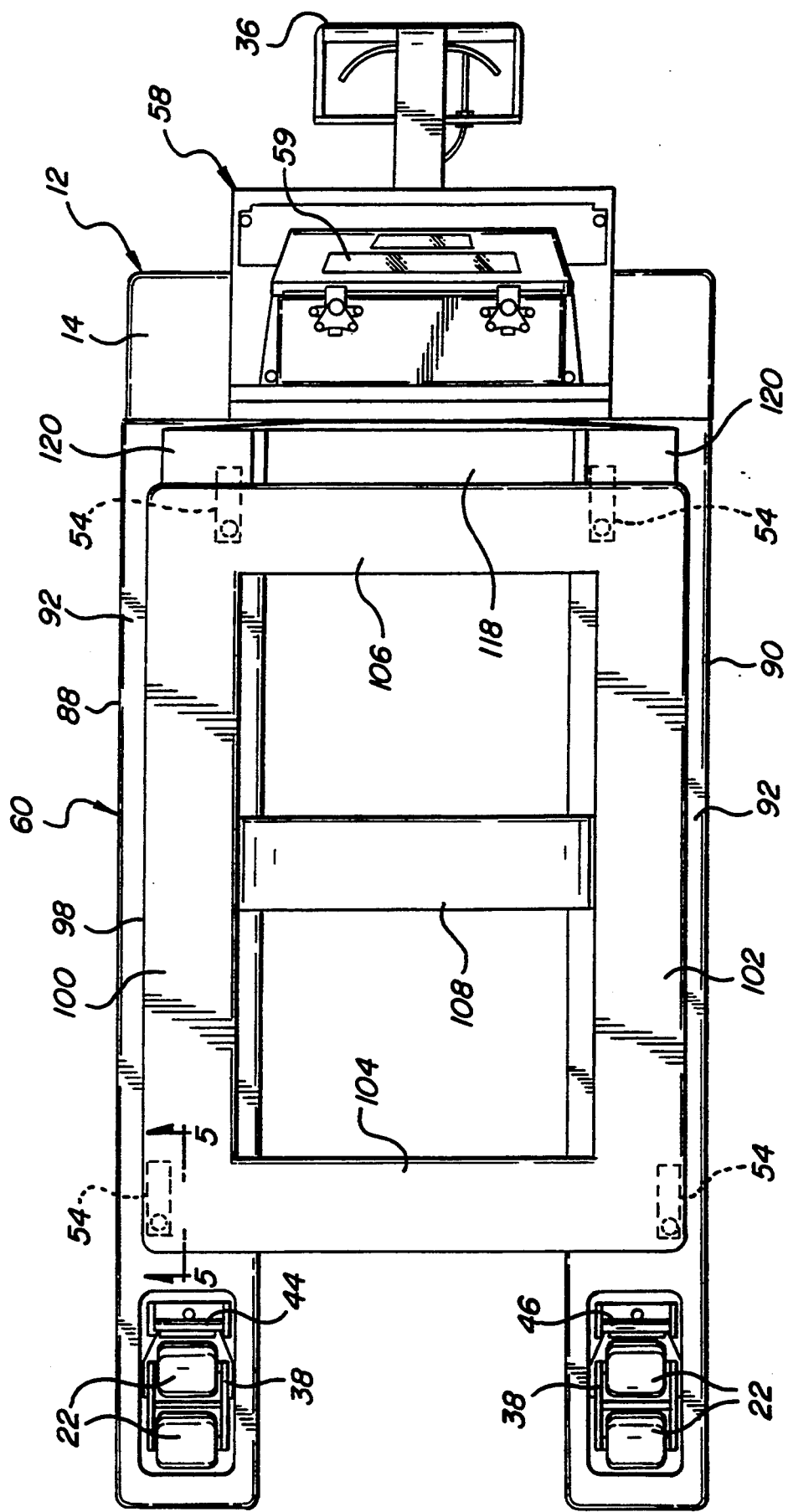

LIFT TRUCK WEIGHING APPARATUS

This invention relates generally to a material lifting and handling truck and more particularly to such truck equipped with apparatus for weighing an object lifted by the truck.

BACKGROUND OF THE INVENTION

Devices suitable for weighing large, heavy objects, such as tote containers of the type used for the storage and handling of liquid chemicals in bulk, have been, for the most part, limited to stationary floor scales of 5,000 pounds or more weighing capacity. Not all facilities that utilize tote containers are equipped with such floor scales and for those that are it is not always convenient or practical to transport the containers to and from the floor scales for weighing.

Some of the prior lift trucks include weighing devices wherein objects, such as tote containers, can be lifted by the trucks and weighed. The accuracy of the weighing apparatus of such lifting trucks is, at best, about 98%. The contents of a typical container weigh about 5,000 pounds, equating to a weighing error of known apparatus of plus or minus 100 pounds. One reason for the relatively high error of prior art apparatus is believed to be lateral loading of the load sensors caused by shifting of the container's contents, uneven flooring, and the like which produces a false reading of the weight of the container and its contents.

An object of this invention is to improve the accuracy of such lift truck weighing apparatus.

SUMMARY OF THE INVENTION AND ADVANTAGES

Lift truck apparatus for lifting and weighing large heavy objects includes a wheeled frame supporting load sensing means having a loading axis along which the weight of an object is to be applied for accurately measuring its weight. A weighing platform is provided and selectively elevated along with the frame by lifting means for lifting and supporting the object on the weighing platform. Load alignment means are coupled to the load sensing means for normally supporting the platform in an aligned position with respect to the loading axis wherein the weight of the object is transmitted to the load sensing means along the loading axis. The load alignment means, however, enables the platform to oscillate laterally of the loading axis to dissipate any lateral forces acting on the object and thereafter self-restore the platform to the aligned position for more accurate measurement of the weight of the object, as compared to known prior lift and weigh devices.

BRIEF DESCRIPTION OF THE DRAWINGS

A presently preferred embodiment of the invention is illustrated in the accompanying drawings, wherein:

FIG. 4 is a view like FIG. 3 but with the fork covers and weigh deck installed;

DETAILED DESCRIPTION

Figure 1:
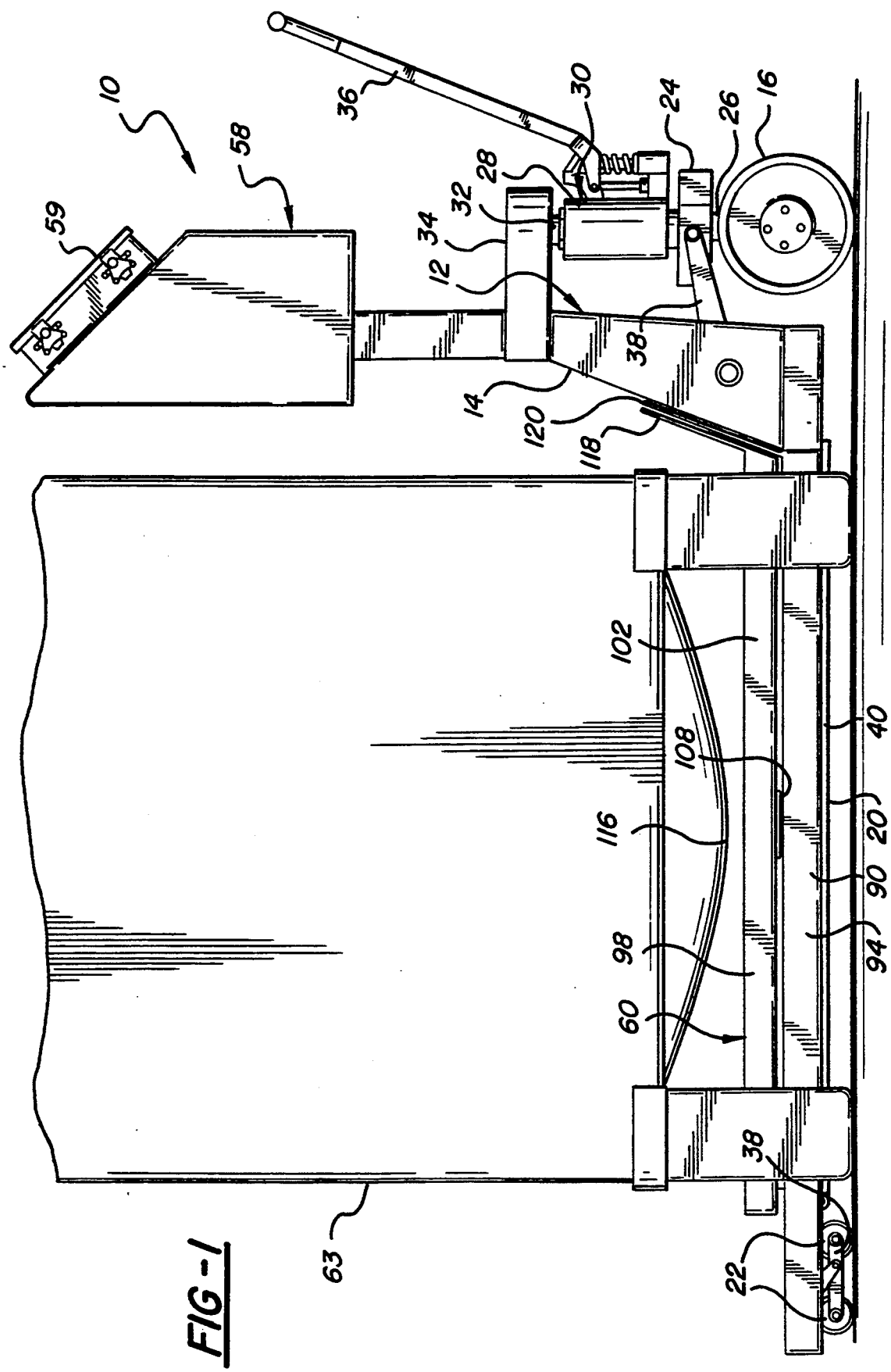
FIG. 1 is a fragmentary side elevational view of the lift truck apparatus illustrating the lifting apparatus in its lowered position.

Lift truck weighing apparatus constructed according to a presently preferred embodiment of the invention is indicated generally by the reference numeral 10 and comprises a pallet lifting truck of conventional construction including a rigid frame 12 having a base 14 mounting a pair of steerable rear wheels 16 and a pair of laterally spaced forks 18, 20 each of which project forwardly of the base portion 14 and mounts a set of front wheels 22.

Figure 2:
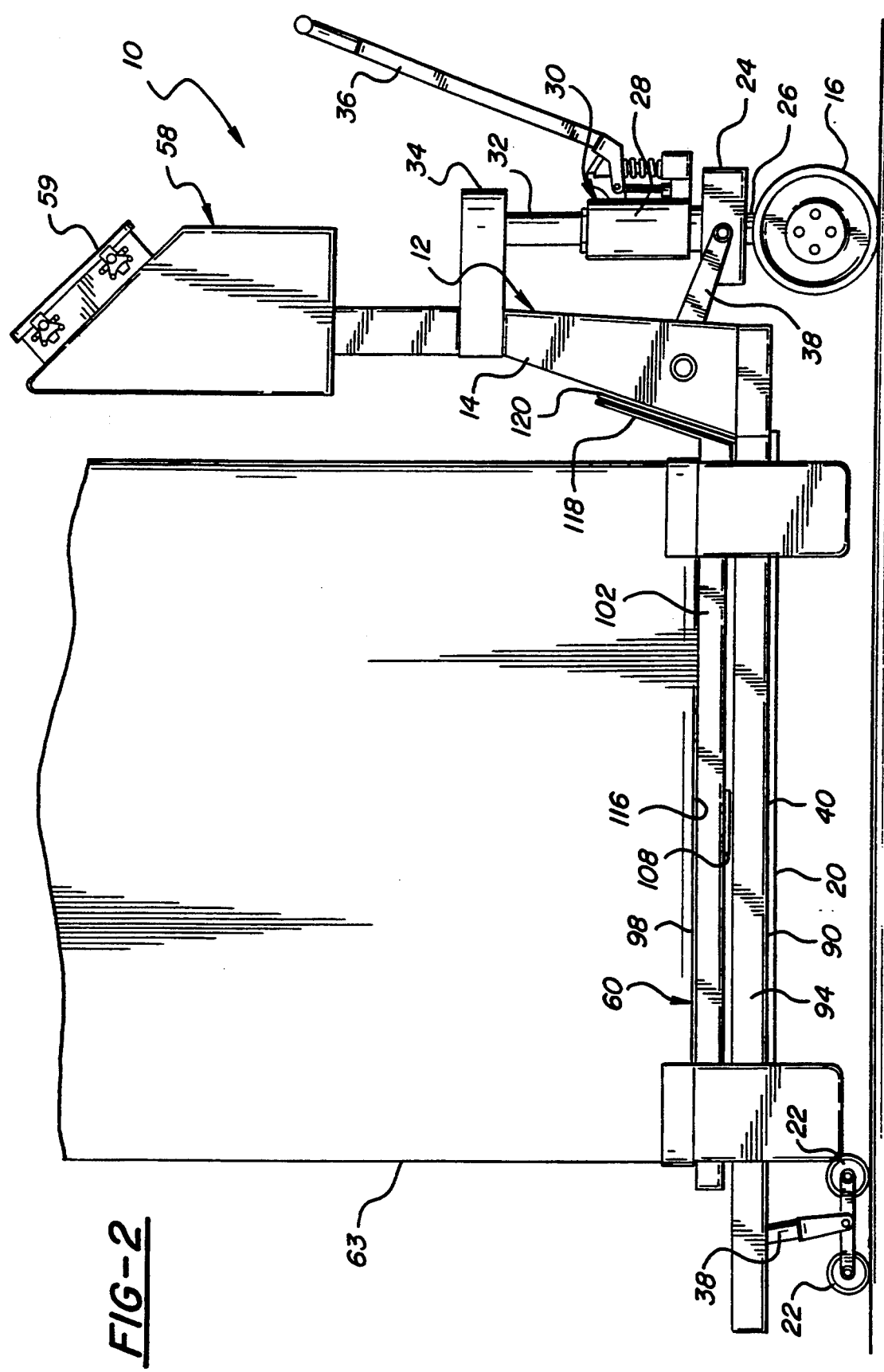
FIG. 2 is a view like FIG. 1 but with the lifting apparatus shown in an elevated position.

The base portion 14 includes a wheel support block 24 journaling a vertical steering shaft 26 coupled at its lower end to the axle of the rear wheels 16 and fixed at its upper end to the cylinder 28 of a hydraulic jack 30. A piston 32 projects out of the cylinder 28 and is secured at its upper free end to a rigid lifting arm 34 of the base portion 14. A control handle 36 is coupled to the cylinder 28 enabling the operator to steer the rear wheels 16 by moving the handle 36 to the left or right in a conventional manner. The handle 36 may also be rocked up and down to actuate the jack 30 and extend the piston 32 thereby elevating the lifting arm 34 from the lowered position shown in FIG. 1 to the raised position shown in FIG. 2. A conventional linkage mechanism 38 interconnects the wheel support block 24, the base portion 14, and the front wheels 22 and is operable to extend the front wheels 22 below the forks 18, 20 for elevating the forks 18, 20 together with the base portion 14 as shown in FIGS. 1 and 2.

A pair of rigid channel members 40, 42 are provided beneath the forks 18, 20, respectively, and are welded or otherwise fixed at their rearward ends to the base 14 and secured at their forward ends to fulcrum axles 44, 46 of the linkage mechanism 38 for lifting movement with the remaining portions of the frame 12. The channels 40, 42 are constructed of steel plate material each having a flat base 40 supported horizontally beneath the forks 18, 20 and a pair of upstanding sidewalls 50, 52 arranged on opposite lateral sides of each fork 18, 20 in spaced relation thereto.

Figure 3:
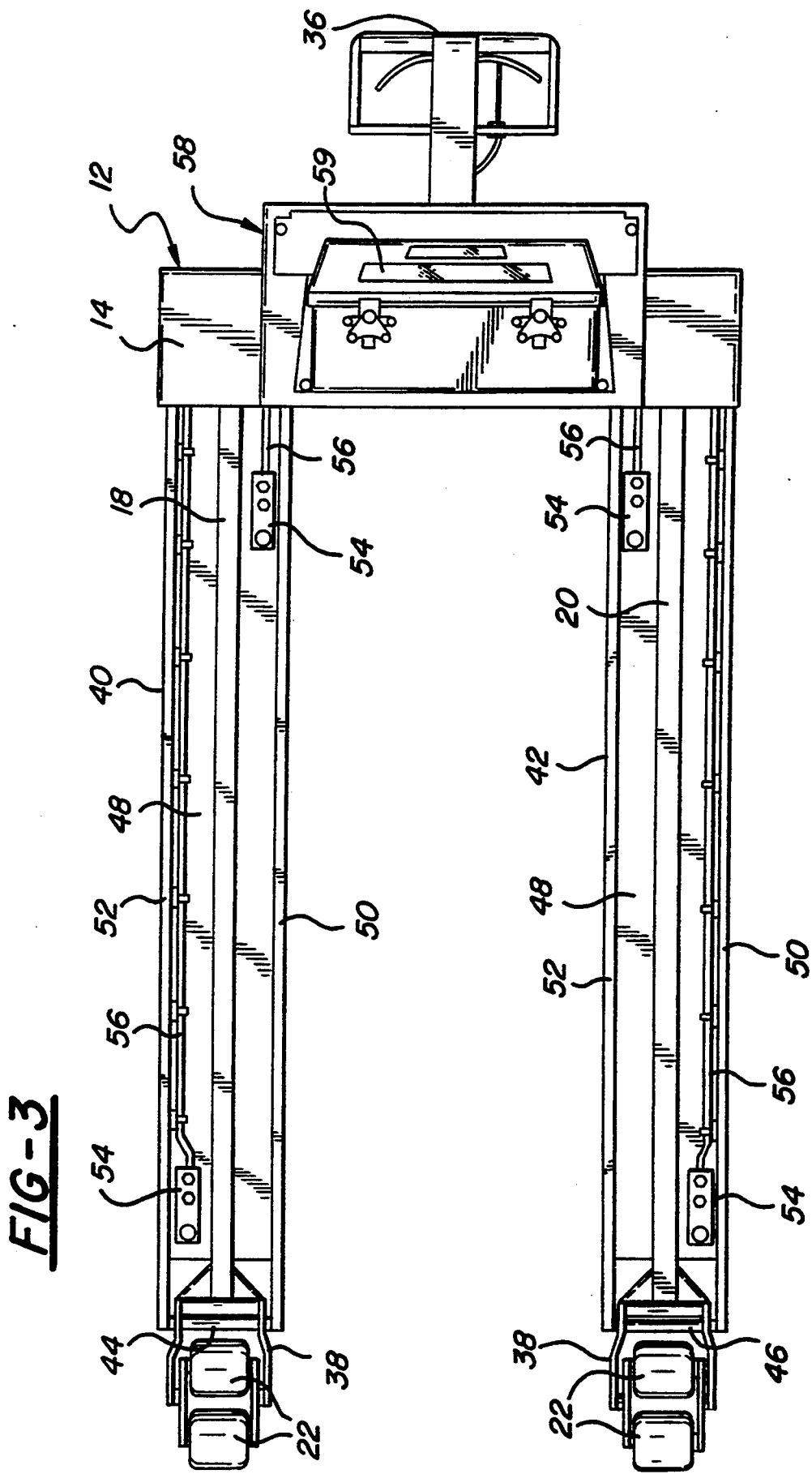
FIG. 3 is a top view of the apparatus shown with the weigh deck and fork covers removed.

Load sensing means comprising four known load sensors or cells 54 are mounted by suitable fasteners 55 to the bases 48 of the channels 40, 42 in the front and back paired arrangement illustrated in FIG. 3 and are electronically coupled by lines 56 to a battery powered known programmable process controller 58 supported by the base 14. A control panel 59 is supported by the base within the view and reach of the operator.

The load cells 54 mount a weighing platform assembly 60 via ball and socket load-aligning coupling devices 62 for supporting the weight of an object such as a tote container 63. As shown best in FIG. 5 and 6, each of the load cells 54 has a vertical loading axis A along which the weight of an object may be transmitted to enable the load cells 54 to determine the weight of the object. Each of the load cells 54 is provided with a threaded aperture 64 extending coaxially of the loading axis A and accommodating the threaded shank 66 of a lower socket member 68 of the coupling device 62. The upper end of the aperture 64 is countersunk to form a recess 70 for the accommodation of an enlarged head or receiver cup 72 of the lower socket member 68. The receiver cup 72 is provided with an upwardly concave recess or indentation 74 whose lowest point or peak 76 lies along the loading axis A of the load cell 54. Access ports 77 are provided in the bases 40 of channel members 40, 42 for accessing the shanks 66 of the socket members 68 for threading the socket members 68 into engagement with their associated load cells 54.

A corresponding plurality of upper socket members 78 are secured to the platform assembly 60 in the identical spaced arrangement as that of the lower socket members 68. The upper socket members 78 are of substantially identical configuration to those of the lower socket members 68 and as such include threaded shank portions 80 and an enlarged head or receiver cup 82 provided with a concave recess or indentation 84 of the same radial curvature as the recess 74 and radii of cups 72, 82, whose peak 86 lies along a load transmitting axis B of the platform assembly 60 associated with each load cell 54.

Figure 6:
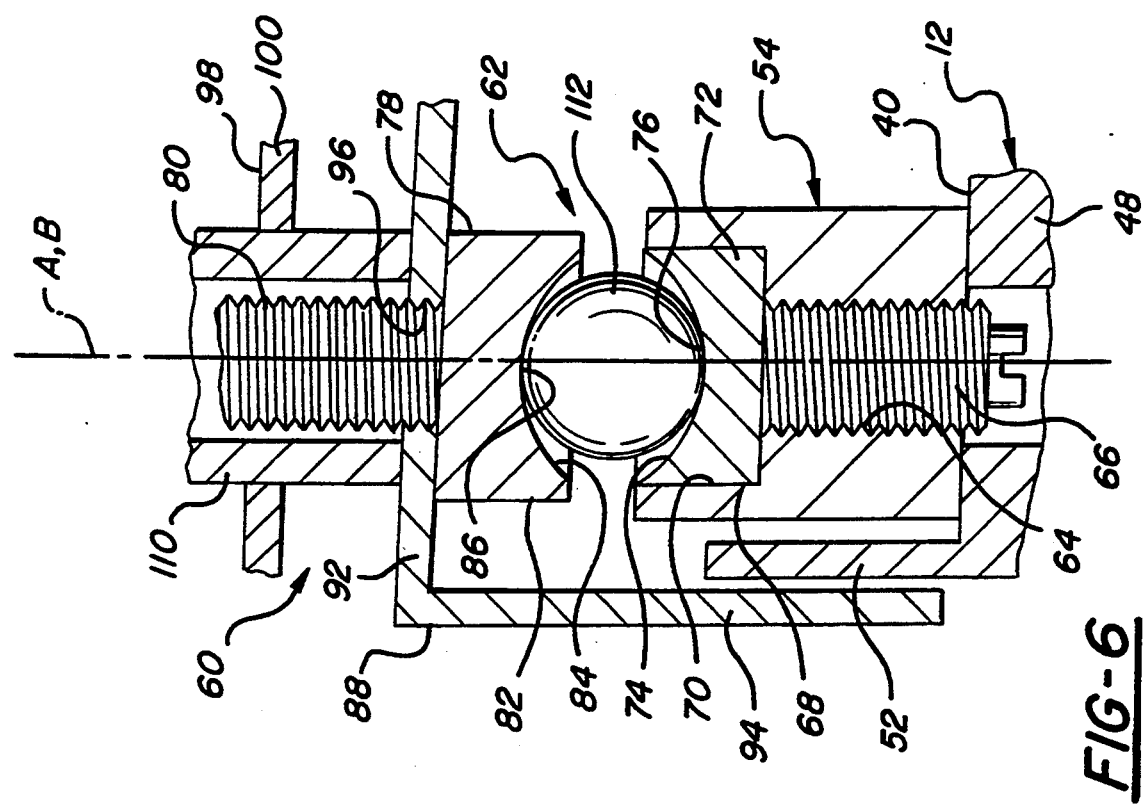
FIG. 6 is an enlarged sectional view of the ball and socket coupling device taken along the line 6—6 of FIG. 5.
Figure 5:
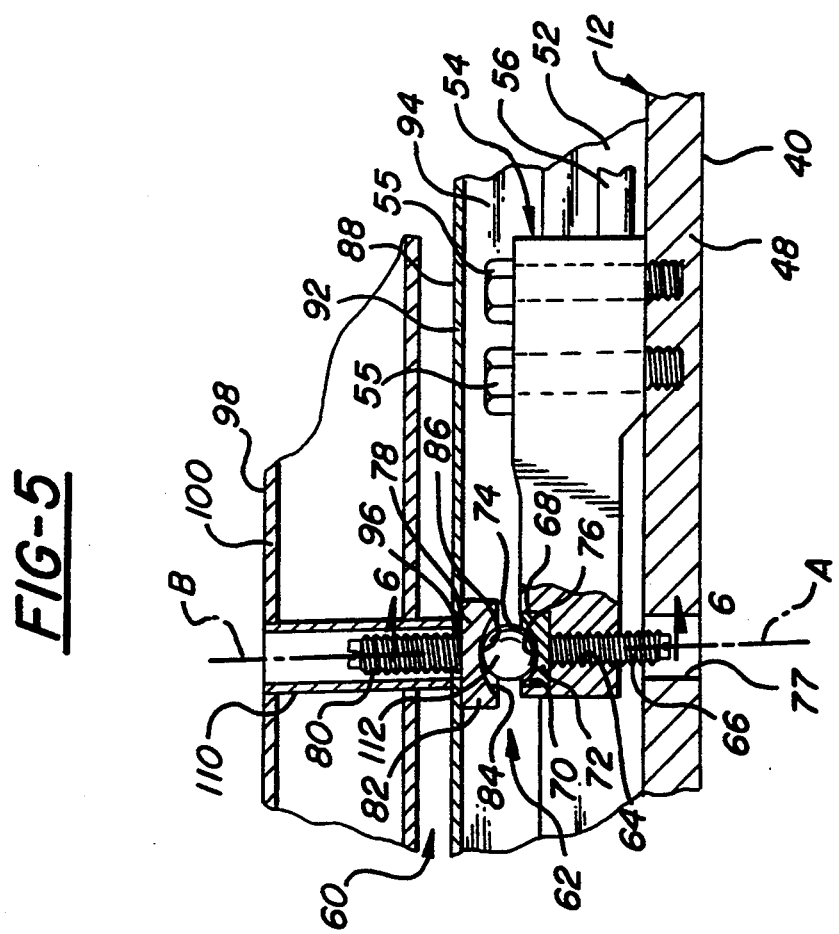
FIG. 5 is an enlarged, sectional view taken along the line 5—5 of FIG. 4.

As illustrated in FIGS. 4-6, the platform assembly 60 includes a pair of inverted U-shaped fork covers 88 each of which has a horizontal top wall 92 overlying the associated fork and a pair of laterally spaced sidewalls 94 overlying the sidewalls 50, 52 of the associated channel members 40, 42. The threaded shanks 80 of the upper socket members 78 are received in threaded apertures 96 of the top wall 92 thereby securing the upper socket members 78 to the fork covers 88, 90. The receiver cups 82 project below the underside of the top wall 92 and the threaded shanks 80 project above the upper surface of the top wall 92.

The platform assembly 60 also includes a rigid weigh deck 98 that may be of open frame construction supported on the fork covers 88, 90, as illustrated in FIG. 4. The weigh deck 98 includes a pair of laterally spaced, longitudinal sections 100, 102 overlying the fork covers 88, 90, respectively, a pair of transverse end sections 104, 106 extending between and interconnecting the longitudinal sections 100, 102 at front and back ends thereof, and an intermediate cross section 108 interconnecting the longitudinal sections 100, 102 midway between the end sections 104, 106. The weigh deck 98 has a plurality of load transferring support legs or sleeves 110 engaging the top of the fork covers 88, 90 to space the weigh deck 98 above the fork covers 88, 90. The sleeves 110 form cavities for reception of the projecting shanks 80 of the upper socket members 78, as illustrated in FIGS. 5 and 6. The weigh deck 98 is separable from the fork covers 88, 90 by lifting the deck 98 off the covers 88, 90. The cavity formed by the inner wall of each support sleeve 110 is relatively larger in diameter than that of the shank 80 to enable the weigh deck 98 to shift laterally on the fork covers 88, 90 by a small amount when a lateral force is applied to the deck 98.

A ball 112 is accommodated within the opposing recesses 74, 84 of each upper and lower socket pair. The ball 112 reacts with point contact between the concave walls of the recesses to transmit the weight of the object from the platform assembly 60 to the load cells 54. The radius of the ball 112 is less than the radius of curvature of each of the recesses 74, 84. The weight of the platform assembly acting on the ball and socket coupling devices 62 urges the socket members 68, 70 and ball 112 of each device to seek the center of curvature of each of the recesses 74, 84 so that the load transmitting axis B of the platform assembly are aligned with the loading axis A of the respective load cells 54, as illustrated in FIGS. 5 and 6. The ball and recess connection, however, enables the fork covers 88, 90 and weigh deck 98 to oscillate laterally of the loading axis when a lateral force acts on the container 63. The self-restoring force of the ball and recess connections dissipates such lateral force and restores the platform assembly 60 to the aligned position.

THE OPERATION

FIG. 1 shows a tote container 63 that is to be lifted and transported, and simultaneously weighed by the apparatus 10. When filled, it is common for the bottom wall 116 of the container 63 to bulge or belly downwardly, as shown exaggerated in FIG. 1, under the weight of the contents. To lift and weigh such a container, the forks and weigh deck are maneuvered beneath the container 63 with the intermediate cross portion 108 located under the belly 116. The weigh deck 98 and fork covers 88, 90 are provided with upwardly and rearwardly projecting dashboard portions 118, 120, respectively, overlying the base 14 of the frame 12 to ensure that the container 63 is supported only on the platform assembly 60 and not directly by the frame 12. The hydraulic jack 30 is actuated to elevate the frame 12 and platform assembly 60 to the position shown in FIG. 2 for lifting and supporting the entire weight of the container 63 on the weigh deck 98. As shown in FIG. 2, the intermediate cross portion 108 engages and lifts the belly 116 so that the container 63 is supported evenly on the weigh deck 98.

The weight of the container 63 is transmitted via the support sleeves 110 through the fork covers 88, 90 to the upper socket members 78 and then to the lower members 68 through the balls 112. The downward axial loading force of the platform assembly 60 and container 63 urges the platform assembly 60 toward the aligned position. If, however, there are lateral forces acting on the container 63 the weigh deck 98 is able to shift laterally a small amount on the fork covers 88, 90 and the ball and socket coupling devices 62 further enable the platform assembly 60 to oscillate laterally relative to the loading axis A. The axial restoring force dissipates such lateral forces bringing the platform assembly 60 back into the aligned position so that the entire weight of the container 63 is transmitted to the load cells 54 along the loading axes A for accurate measurement of the weight of the object.

The load cells 54 generate cumulative weight signal information processed by the controller 58 for calculating the weight of the container 63 and/or its contents. The measured weight may be displayed at the control panel 59 or electronically recorded. The apparatus has been shown to be accurate to within 0.1% to 0.2% for loads of up to about 5,000 pounds.

The apparatus 10 also has utility at time of filling the container in that the operator can lift the container prior to filling and either observe the accumulating weight of the material introduced into the container as measured by the apparatus or else electronically couple the apparatus to an automated valve for filling the container with a precise amount of material based on program information provided to the controller 58.

I claim:

1. Lift truck apparatus for lifting and weighing an object, said apparatus comprising:
   a wheeled frame having a plurality of laterally spaced forks;
   a rigid weighing platform;
   lift means for elevating said frame and said platform to lift and support an object on said platform;

a plurality of load sensors supported by said forks at spaced apart locations each having a loading axis along which the weight of an object is to be applied for accurately measuring its weight; and a plurality of load-aligning coupling devices corresponding in number and spacing to said load sensors each coupled to an adjacent one of said load sensors for normally supporting said platform in an aligned position with respect to said loading axis wherein the weight of the object is transmitted to said load sensors along said loading axis, while enabling said platform to oscillate laterally in a plurality of directions relative to said loading axis to dissipate lateral forces acting on the object and self-restore said platform to said aligned position for measuring the weight of the object, said platform extending laterally between said forks for transferring loads applied to the platform between said spaced forks axially to said load sensors via said coupling devices.

2. The apparatus of claim 1 wherein each of said load sensors comprises a plurality of load cells.

3. The apparatus of claim 2 wherein each of said load-aligning coupling devices comprises ball and socket coupling devices secured to said load cells and supporting said platform.

4. The apparatus of claim 3 wherein each of said ball and socket coupling devices comprises a lower socket member attached to an associated one of said load cells along said loading axis and an upper socket member secured to said platform, said socket members having opposing concave recesses, and a ball accommodated within each of said opposing recesses, said ball having a radius smaller than the radius of curvature of said recesses.

5. The apparatus of claim 4 wherein said platform includes a bottom portion mounting said upper socket members and a separate rigid weigh deck portion having a plurality of support legs engaging said weigh deck above said bottom portion.

6. The apparatus of claim 5 wherein said support legs have a sleeve construction providing a cavity within said support legs and said upper socket members including shank portions projecting above said bottom portion and received in said cavities of said support legs.

7. The apparatus of claim 6 wherein said support leg cavities are relatively larger in diameter than that of said shank portions enabling said weigh deck to shift laterally on said bottom portion.

8. The apparatus of claim 5 wherein said frame includes a base portion mounting a pair of forwardly projecting, laterally spaced forks and said bottom portion comprises a pair of laterally spaced fork covers overlying said forks, said weigh deck including a pair of laterally spaced longitudinal sections overlying said fork covers, a pair of transverse end sections extending transversely between and interconnecting said longitudinal sections, and an intermediate cross section spanning said longitudinal sections between said end sections.

9. The apparatus of claim 8 wherein said fork covers and said weigh deck include dashboard portions overlying said base portion of said frame to shield said base portion against direct supportive contact by the object when supported on said platform.

10. The apparatus of claim 2 wherein said frame includes a pair of laterally spaced channel members each mounting two of said load cells.

11. The apparatus of claim 10 wherein said platform includes a pair of laterally spaced fork covers overlying said channel members and a weigh deck supported on said fork covers.

12. The apparatus of claim 11 wherein said weigh deck is separable from said fork covers.

13. The apparatus of claim 2 wherein said load sensors include a process controller electronically coupled to each of said load cells for receiving cumulative input information from said load cells representative of the load applied to each load cell and processing said input information to calculate the weight of the object.

14. Lifting and weighing apparatus, comprising:

a rigid frame having a base portion mounting steerable rear wheels and a pair of laterally spaced forks secured at one end to said base portion and projecting forwardly therefrom to free ends mounting front wheels;

a pair of laterally spaced rigid channel members extending beneath said forks and fixed at one end to said base portion of said frame and supported at opposite ends by said front wheels;

a plurality of load sensors mounted on said channel members each of which has a vertical loading axis along which the weight of an object is to be transmitted for accurately measuring the weight of the object;

a platform assembly including a pair of laterally spaced fork covers overlying said forks, and a rigid weigh deck having an open frame construction including a pair of laterally spaced longitudinal sections overlying said fork covers, a pair of transverse end sections extending between and interconnecting said longitudinal sections, and an intermediate cross section bridging said longitudinal sections between said end sections, said weigh deck including a plurality of sleeve-like support legs corresponding in number and arrangement to said load sensor axes engaging said fork covers and supporting the remainder of said weigh deck spaced above said fork covers;

ball and socket coupling devices interconnecting said platform assembly and said load sensors, each of said coupling devices including a lower socket member secured to an associated one of said load sensors and an adjacent upper socket member secured to an associated one of said fork covers, said upper socket members having shank portions projecting above said fork covers and received in said support legs of said weigh deck, said socket members having opposing arcuately concave recesses supporting a ball therebetween, the peak of said lower socket recess lying along said loading axis of the associated load sensor and the peak of the upper socket recess lying along an associated load transmitting axis of said platform assembly, said ball having a radius smaller than that of the curvature of each of said recesses causing said ball to self-align said load transmitting axes of said platform assembly with the associated loading axes of said load sensor; and lifting means for selectively elevating said frame and said platform assembly to lift and support the weight of the object on said platform assembly thereby transmitting the weight of the object to said load sensors via said ball and socket coupling devices, the configuration of the ball and socket connections enabling said platform assembly to oscillate in all directions laterally of said loading axis to dissipate any lateral forces acting on the object and thereafter restore said platform assembly to the self-aligned position wherein all of the weight of the object is transmitted to the load sensors along the loading axis.

15. Lift truck apparatus for lifting and weighing an object, said apparatus comprising:

a wheeled frame;

a weighing platform;

lift means for elevating said frame and said platform to lift and support an object on said platform;

a plurality of load sensors mounted on said frame at spaced apart locations each having a loading axis along which the weight of an object is to be applied for accurately measuring its weight; and a plurality of load-aligning coupling devices corresponding in number and spacing to said load sensors each coupled to an adjacent one of said load sensors for normally supporting said platform in an aligned position with respect to said loading axis wherein the weight of the object is transmitted to said load sensors along said loading axis, while enabling said platform to oscillate laterally in a plurality of directions relative to said loading axis to dissipate lateral forces acting on the object and self-restore said platform to said aligned position for measuring the weight of the object, said platform having a plurality of load transfer legs corresponding in number to said load sensors and in corresponding overlying spaced relation to said coupling devices for transmitting the load on said platform to said coupling devices through said legs.

16. Lifting and weighing apparatus, comprising:

a rigid frame having a base portion mounting steerable rear wheels and a plurality of laterally spaced forks secured at one end to said base portion and projecting forwardly therefrom to free ends mounting front wheels;

a plurality of load sensors carried by said forks each having a vertical loading axis along which the weight of an object is to be transmitted for accurately measuring the weight of the object;

a platform assembly including a corresponding plurality of laterally spaced fork covers overlying said forks, and a separate rigid weigh deck overlying and spanning said fork covers, said weigh deck including a plurality of support legs corresponding in number and arrangement to said load sensor axes engaging said fork covers and supporting the remainder of said weigh deck at a level spaced above said fork covers;

ball and socket coupling devices interconnecting said platform assembly and said load sensors, each of said coupling devices including a lower socket member secured to an associated one of said load sensors and an adjacent upper socket member secured to an associated one of said fork covers, said socket members having opposing arcuately concave recesses supporting a ball therebetween, the peak of said lower socket recess lying along said loading axis of the associated load sensor and the peak of the upper socket recess lying along an associated load transmitting axis of said platform assembly, said ball having a radius smaller than that of the curvature of each of said recesses causing said ball to self-align said load transmitting axes of said platform assembly with the associated loading axes of said load sensor; and lifting means for selectively elevating said platform assembly to lift and support the weight of the object on said platform assembly thereby transmitting the weight of the object to said load sensors via said ball and socket coupling devices, the configuration of the ball and socket connections enabling said platform assembly to oscillate in a plurality of directions laterally of said loading axis to dissipate any lateral forces acting on the object and thereafter restore said platform assembly to the self-aligned position wherein all of the weight of the object is transmitted to the load sensors along the loading axis.

* * * * *